United States Patent [19]

Nishikawa

[11] 4,274,175
[45] Jun. 23, 1981

[54] WIPING DEVICE

[76] Inventor: Tadashi Nishikawa, 1-32 Nakanodori, Higashi-Sumiyoshi, Osaka, Japan

[21] Appl. No.: 948,411

[22] Filed: Oct. 4, 1978

[51] Int. Cl.³ .............................................. B60S 1/06
[52] U.S. Cl. .............................. 15/250.24; 15/250.38; 15/250.41
[58] Field of Search ........... 15/250.24, 259.26, 250.29, 15/250.35, 250.36, 250.38, 250.39, 250.41

[56] References Cited

U.S. PATENT DOCUMENTS

| | | | |
|---|---|---|---|
| 1,865,158 | 6/1932 | Acierno | 15/250.24 |
| 3,025,555 | 3/1962 | Ramirez | 15/250.24 |
| 3,800,355 | 4/1974 | Lamprecht | 15/250.24 |
| 3,902,218 | 2/1975 | Bryant | |
| 3,924,290 | 12/1975 | Puyplat | |

FOREIGN PATENT DOCUMENTS 49-16022  4/1974  Japan .
51-25382  6/1976  Japan .

Primary Examiner—Robert W. Jenkins
Attorney, Agent, or Firm—Armstrong, Nikaido, Marmelstein & Kubovcik

[57] ABSTRACT

A wiping device for wiping windowpanes, particularly the windshield of an automobile. The device comprises an annular belt adapted to revolve along the entire periphery of a windowpane, and a wiper blade joined at its opposite ends to the annular belt and extending across the windowpane.

6 Claims, 21 Drawing Figures

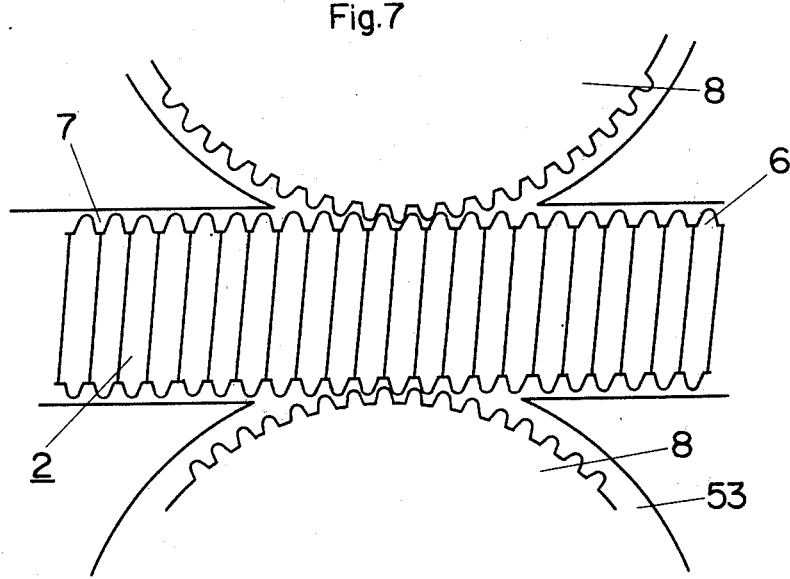
Fig. 7
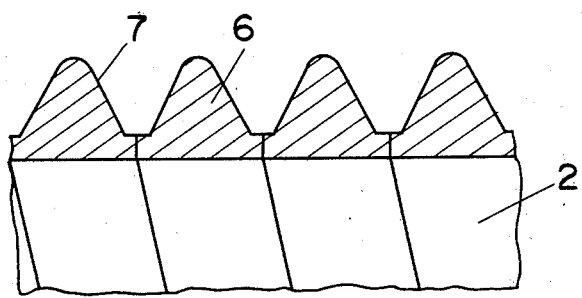
Fig. 8 (a)
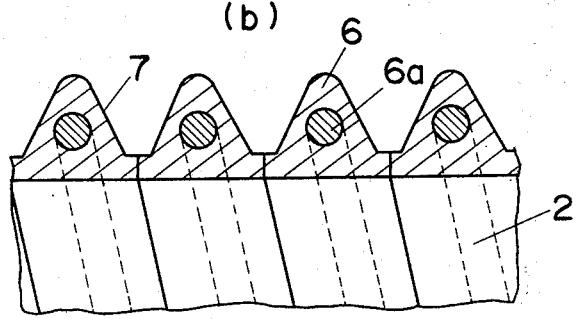
(b)

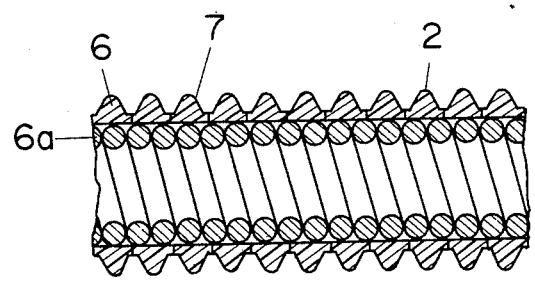
Fig.8
(c)
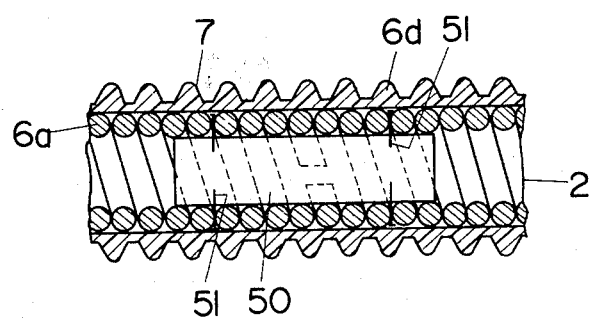
(d)

(a)

(b)

WIPING DEVICE

BACKGROUND OF THE INVENTION

The present invention relates to a wiping device for wiping windowpanes, particularly the windshield of an automobile.

Conventionally, the wiping device such as used with automobiles is so designed that the wiper blade is reciprocated on a windowpane or windshield to wipe only a sector-shaped area rather than the entire area thereof, resulting in the disadvatages that the field of vision is narrowed and that the reciprocating motion of the wiping blade itself is an eyesore.

SUMMARY OF THE INVENTION

The present invention has been accomplished with the above in mind.

A principal object of the invention is to provide a wiping device adapted to wipe a windowpane over the entire area thereof.

Another object of the invention is to provide a wiping device adapted to wipe a polygonal windowpane while following its configuration.

A further object of the invention is to provide a wiping device designed for smooth wiping operation with reduced chattering produced during operation.

Yet another object of the invention is to provide a wiping device which assures stabilized contact between the wiper blade and the windowpane.

Still a further object of the invention is to provide a wiping device wherein the revolving motion of an annular belt for rotating the wiper blade at a high speed on a windowpane is smoothly effected.

The invention will be described in more detail with reference to the accompanying drawings.

BRIEF DESCRIPTION OF THE DRAWINGS

FIG. 7 is an enlarged view showing the meshing relation between said annular belt and gear wheels;

FIGS. 8 (a), (b), (c) and (d) are enlarged sectional views showing wire materials for constituting said annular belt;

DESCRIPTION OF THE PREFERRED EMBODIMENTS

Figure 2:
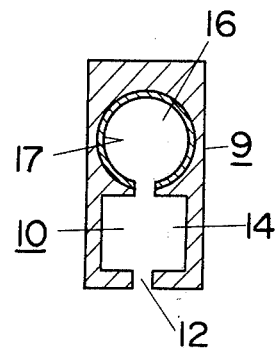
FIG. 2 is a sectional view of a guide rail used in said embodiment.
Figure 3:
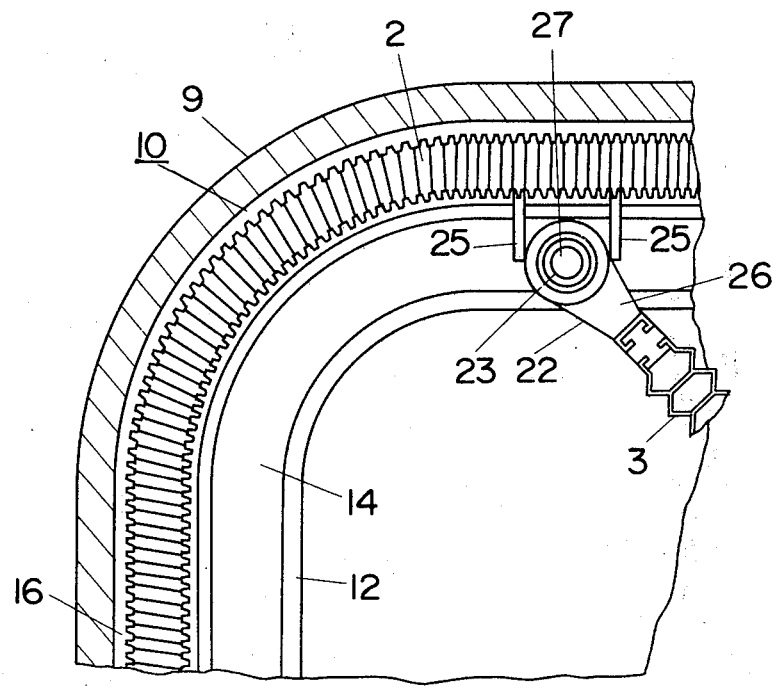
FIG. 3 is an enlarged front sectional view of a portion marked A in FIG. 1.
Figure 4:
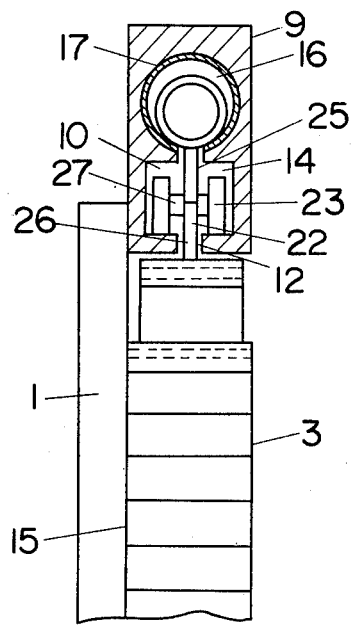
FIG. 4 is an enlarged lateral sectional view of said portion marked A.
Figure 5:
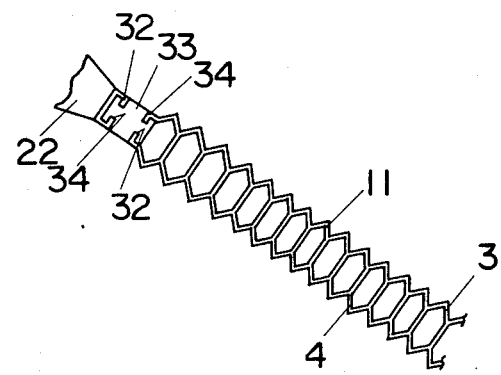
FIG. 5 is a fragmentary plan view of a wiper blade used in said embodiment.
Figure 6:
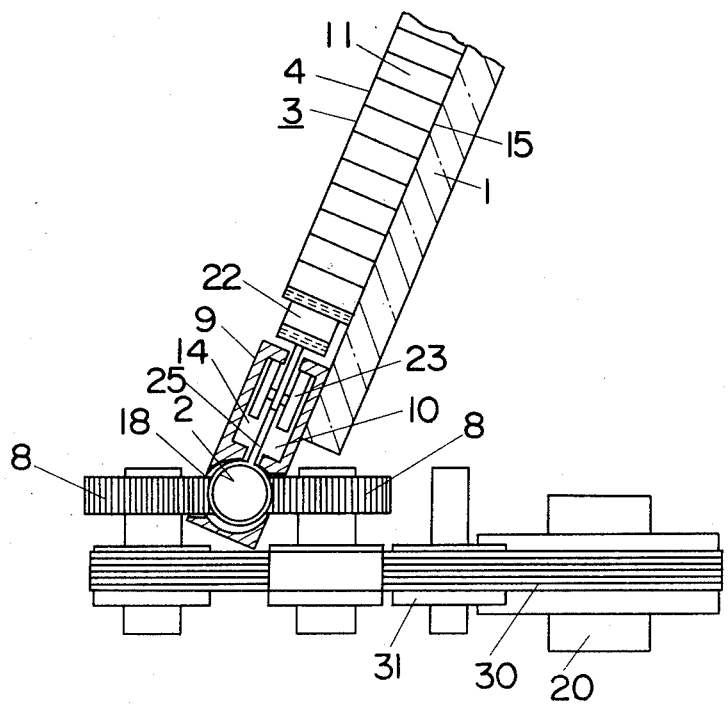
FIG. 6 is a partly sectional view showing an annular belt driving mechanism.

The drawings illustrate a wiping device according to the present invention as applied to the windshield 1 of an automobile. Installed around the entire periphery of the windshield 1 is a guide rail 9 whose sectional shape is shown in FIG. 2 and which has a runway groove 10, said guide rail being positioned with its opening 12 directed inwardly. An annular belt 2 is a coiled belt in the form of a wire about 0.7 mm in diameter spirally wound into a coil about 6 mm in outer diameter so as to be bendable at any places for smooth revolution at a high speed within the rail 9 extending around the curved automobile windshield 1, said annular belt being adapted to travel in one direction within a round groove 16 disposed outside the runway groove 10. As shown in FIG. 6, a pair of gear wheels 8 are disposed on opposite sides of the annular belt 2 through windows 18 communicating with the round groove 16 in the guide rail 9, said pair of gear wheels 8 being driven by a belt 30 cooperating with a belt buffering pulley 31 and driven by a motor 20, thereby transmitting the driving power to the annular belt 2. The annular belt 2, as shown in FIG. 8 (a), is formed by winding a wire material 6 of subtantially tirangular section in such a manner that the inner surfaces of the convolutions are flush with each other and that the apexes are discontinuously arranged, thereby forming tooth surfaces 7 having a constant pitch. The gear wheels 8 mesh with said tooth surfaces 7, so that the annular belt 2 can be revolved at a high speed within the guide rail 9 without slip. In addition, the annular belt 2 may be formed by winding a steel wire 6a of substantially triangular section having a wire material 6 made of wear-resistant synthetic resin, such as polyamide resin, as shown in FIG. 8 (b), in which case the annular belt can be revolved quietly with reduced sound of friction between it and the gear wheels 8 during meshing. Usually, the gear wheels 8 are disposed approximately centrally below the guide rail 9, and as occasion arises, they may be disposed on the right and left sides of the guide rail 9 to obtain a higher driving power. The round groove 16 has a lining 17 applied to the inner surface thereof over the entire length and its inner diameter is larger than the outer diameter of the annular belt 2, with a clearance defined therebetween to minimize the frictional resistance during the revolution of the annular belt. The runway groove 10 is composed of said round groove 16 and a roller runway groove 14 communicating with said round groove 16. Rollers 23 attached to a connector 22 which connects a wiper blade 3 to said annular belt 2 run in said roller runway groove 14. The connector 22 comprises a connecting plate 26 having one end projecting out of the opening 12 in the guide rail 9 and the other end held between a pair of claws 25 which project from the annular belt 2 into the roller runway groove 14, and the rollers 23 rotatably mounted on a shaft 27 projecting from the connecting plate 26, the arrangement being such that as the annular belt 2 is revolved, the connector 22 runs in the roller runway groove 14 to move the wiper blade 3. Radial bearings are used as said rollers 23 to assure smooth running of the connector 22 in the guide rail 9 and of the wiper blade 3 whose angle with the annular belt 2 changes with the revolution of the latter. In this connection, it is to be noted that the pawls 25 project into the outside of the annular belt 2 from a joint (not shown) inserted in the annular belt 2, said joint being fixed to the annular belt 2 as by welding, whereby the pawls 25 are fixed in position. The annular belt 2 is endless. As for the wiper blade 3, as illustrated, it is capable of expansion and contraction in the direction of the length and also capable of bending with respect to the direction of the length and its opposite ends are connected to the portions of the annular belt 2 located on a diagonal of the windshield 1 by means of said connectors 22, whereby it is mounted on the front surface of the windshield 1. In the embodiment shown in FIGS. 3 through 6, the wiper belt is a unitary long body of soft synthetic resin or rubber, comprising a plurality of hexagons opened at their upper and lower sides and connected together at their respective adjacent sides to form serrated surfaces 11 on opposite sides, and an inwardly turned locking portion 32 at each of the opposite ends fitted in a locking groove 34 formed at one end of a joint 33, said joint 33 having a locking groove 34 at the other end thereof which receives the inwardly turned locking portion 32 of the connector 22. The wiper blade is in the form of a pantograph having opposite serrated surfaces and a flat surface that is in contact with the window pane, as seen in FIG. 5. Thus, the wiper blade 3 is removably attached to the annular belt 2 with its flat bottom surface contacted with the windshield 1, so that with the revolution of the annular belt 2, the wiper blade 3 is rotated in sliding contact with the front surface of the windshield 1 while following the configuration of the windshield 1 and while expanding and contracting, thereby thoroughly wiping the entire area of the front surface of the windshield by its flat bottom surface 15.

Figure 9:
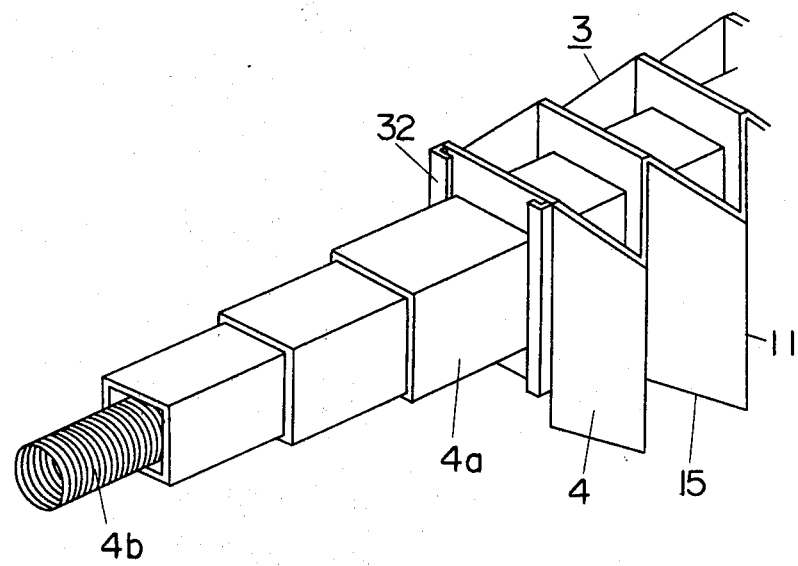
FIGS. 9 (a) and (b) are fragmentary perspective views showing the expanded and contracted states of an embodiment of a wiper blade.
Figure 9:
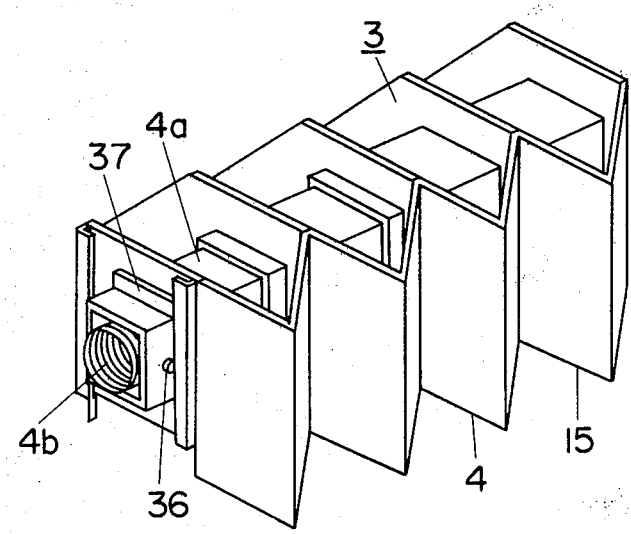
Figure 10:
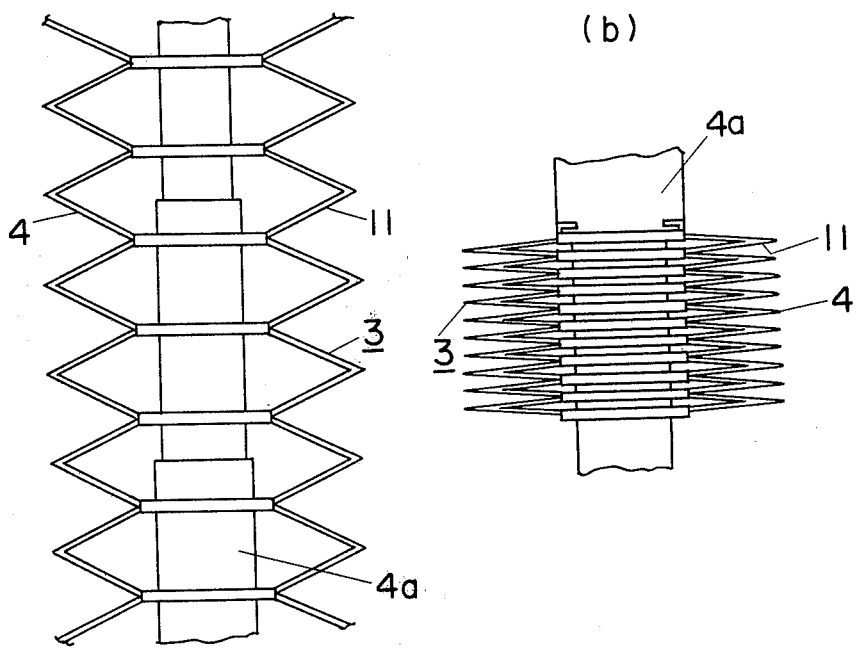
FIGS. 10 (a) and (b) are fragmentary plan views of said wiper blade in its expanded and contracted states.

In an embodiment shown in FIGS. 9 and 10, a multistage expansible sleeve 4a of soft synthetic resin which has some amount of bending elasticity with respect to the direction of the length and which is telescopically constructed to be capable of expansion and contracton in the direction of the length is inserted in a blade body 4, similar to that shown in the above embodiment, and a spirally wound core material 4b which is expansible and also bendable is inserted in said expansible sleeve 4a and extends throughout the length thereof, thereby forming a wiper blade 3. As shown in FIG. 9 (b), the core material 4b is fixed to the expansible sleeve 4a at the opposite ends by stops 36 and the expansible sleeve 4a has flanges 37 anchored in the opening in the blade body 4, so that the three are fixed together at the opposite ends. This wiper blade 3 is attached to the annular belt 2 in the same manner as in the above embodiment. The expansible sleeve 4a and the core material 4b serve to prevent the chattering of the wiper blade 3 otherwise caused by the high speed rotation thereof and to assure intimate contact of the blade body 4a with the front surface of the curved windshield 1.

Figure 11:
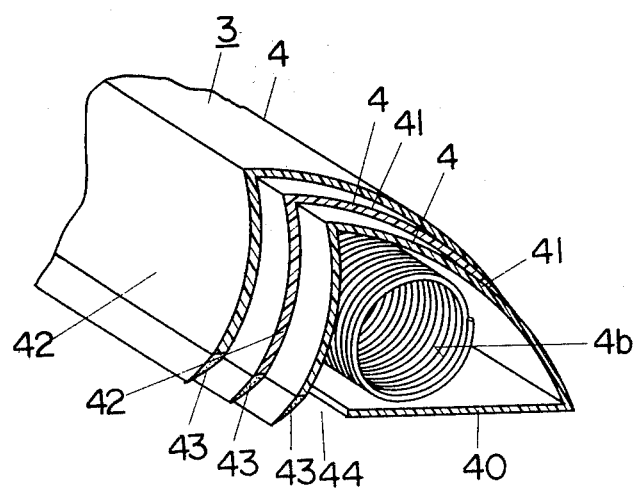
FIG. 11 is a fragmentary perspective view of another embodiment of a wiper blade.

In an embodiment shown in FIG. 11, a plurality of large and small hollow blade bodies 4 each substantially in the form of a triangle in section in which the base 40 for contact with the windshield 1 is flat and the other two sides are arcuate convex and concave pieces 41 and 42, respectively, are connected together to be lengthwise expansible, each blade body 4 having a tongue 43 of soft material, such as rubber, extending from the lower end of the concave piece 42, thereby constituting a wiper blade 3. The wiper blade 3 has its concave and convex pieces 42 and 41 change places with each other at the middle of its length so that the convex pieces 41 are turned forwardly in the direction of rotation, with the tongues 43 intimately contacted with the front surface of the windshield 1 when the wiper blade is attached to the windshield 1. A slot 44 is provided between the bottom piece 40 and the concave pieces 42 to establish discontinuity therebetween, preventing the twist of the wiper blade 3 otherwise caused by the high speed rotation thereof, assuring smooth expansion and contraction of the blade bodies 4, and giving them the ability to bend over the length, thereby increasing the ability of the wiper blade to intimately contact the front surface of the curved windshield 1. Further, a core material 4b similar to that shown in the above embodiment is inserted in the blade bodies 4 and extends throughout the length, the opposite ends of said core material 4b, together with the opposite ends of the blade bodies 4, being connected to the annular belt 2, thereby preventing chattering during high apeed rotation. Further, the surface of the bottom piece 40 to be contacted with the windshield 1 is provided with a plurality of longitudinally extending slits for reducing the area of contact between the bottom piece 40 and the windshield 1 to assure smooth sliding motion of the wiper blade 3.

Figure 13:
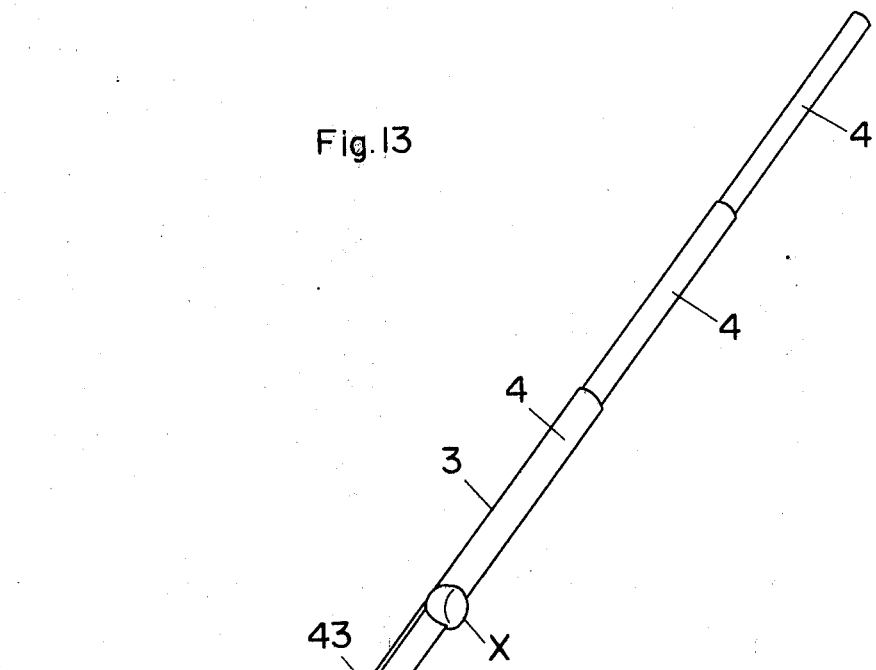
FIG. 13 is a perspective view of said wiper blade of FIG. 12.
Figure 12:
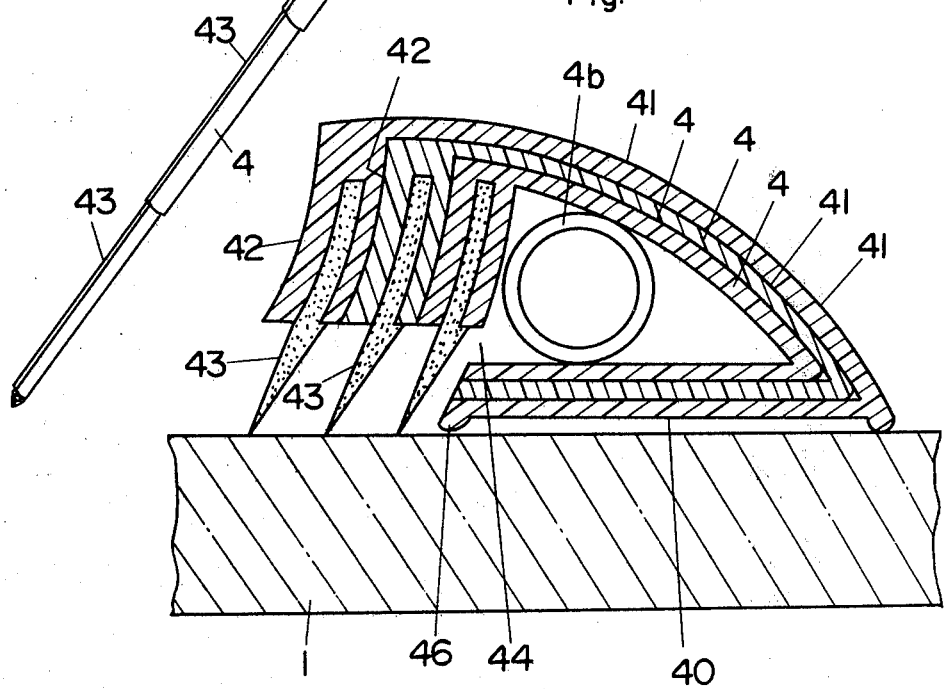
FIG. 12 is a sectional view of a further embodiment of a wiper blade.

In the above embodiment shown in FIG. 11, the tongues 43 for wiping the stains off the windshield 1 extend from the lower ends of the concave pieces 42. However, as shown in FIG. 12, if the upper ends of the tongues 43 are inserted in the lower ends of the concave pieces 42 of the blade bodies 4, the strength of the tongues 43 can be increased. As shown in FIG. 12 also, the front and rear edges of the bottom piece 40 may be formed with longitudinally extending ribs 46 so as to reduce the area of contact between the bottom piece 40 and the windshield 1. In this case, if the middle point X of the wiper blade 3 is fixed to the windshield 1, it is possible to further reduce the chattering of the wiper blade 3 during high speed rotation. The middle base of the wiper blade 3 shown in FIG. 13 may be attached to the windshield 1 as by a sucking disc or other fixture.

Figure 14:
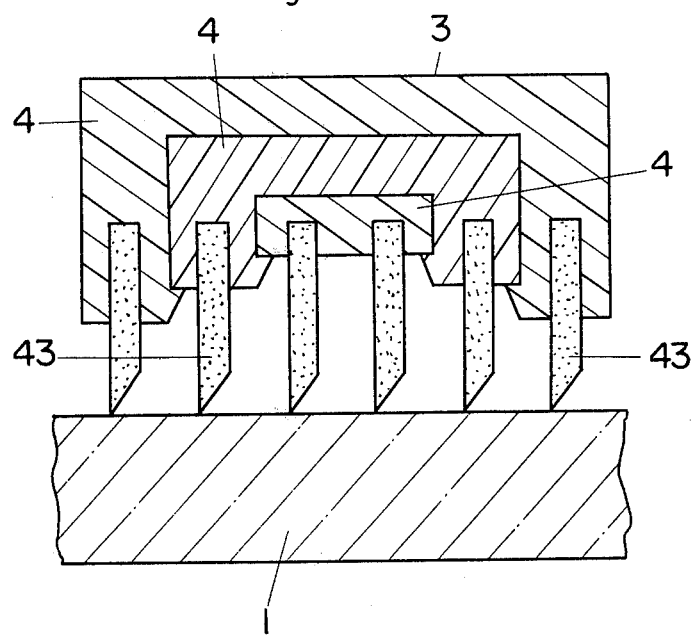
FIGS. 14 and 15 are sectional views showing still another embodiment of a wiper blade.

In an embodiment shown in FIG. 14, a lengthwise expansible wiper blade 3 comprises an outer blade body 4 of soft synthetic resin having a substantially U-shaped section opened at the bottom, an inner blade body 4 slidably fitted to said outer blade body 4, and tongues 43 of rubber or other soft material attached to the lower ends of said blade bodies 4. As in the embodiments described above, the wiper blade 3 is mounted on the front surface of the windshield 1 by having its opposite ends attached to the annular belt 2, with the tongues 43 in contact with the front surface of the windshield 1 for removal of the stains from the front surface as the wiper blade is moved.

Figure 1:
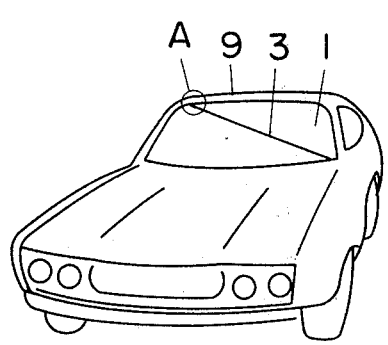
FIG. 1 is a schematic perspective view showing an embodiment of the invention.
Figure 15:
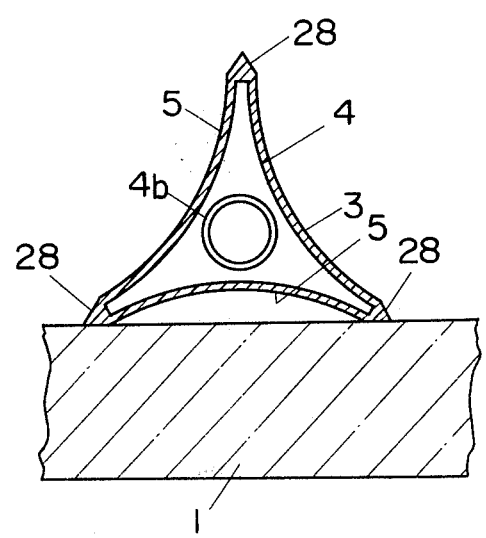
Figure 16:
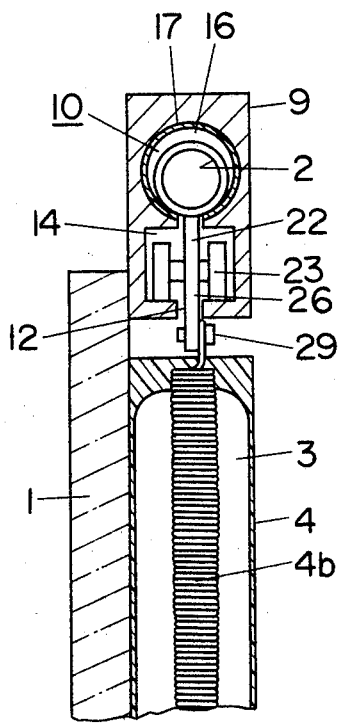
FIG. 16 is a sectional view corresponding to the portion marked A in FIG. 1, using the wiper blade shown in FIG. 15.

A wiper blade 3 shown in FIG. 15, like said annular belt 2, comprises a bendable and expansible coil spring 4b, and a soft elastic material 4, such as rubber, of substantially triangular section covering said coil spring throughout the length, each end of said coil spring 4b being connected to one end of the previously mentioned connector 26 by a pin 29. The wiper blade 3 is attached at its opposite ends to the annular belt 2 at two points by said connectors 22 so that it passes substantially through the center of the windshield 1, as shown in FIG. 1. Thus, with the high speed revolution of the annular belt 2, the wiper blade 3 is rotated on the front surface of the windshield 1 while expanding and contracting depending upon its position and moving over the entire area of the windshield 1. Two of the three vertexes 28 of said substantially triangular soft elastic material 4 having its sides inwardly curved to provide concave surfaces 5 will intimately contact the front surface of the windshield 1, so that even if the windshield 1 is curved, the wiper 3 changes its shape to conform to the curved shape of the windshield 1 for wiping the entire area thereof. In this embodiment, since the soft elastic material forming the wiper blade is a polygon in section with one of the surfaces contacted with the windshield 1, even if said one surface wears out, the remaining surfaces of the wiper blade can be utilized, enabling the wiper blade to be used for a long time without having to be replaced. Particularly with the arrangement shown in FIG. 15 wherein the surfaces are concaved so that the opposite ends alone are pressed against the windshield, it is possible to prevent the wiper blade from floating up even if it is acted upon by a twisting force or a expanding or contracting force, thus assuring the proper contact pressure acting on the windshield. Moreover, the triangular section assures the highest stability of the operation of the wiper blade. Further, since the annular belt is spirally wound to be bendable, it is possible for the annular belt to absorb vibrations which are produced when it is revolving and moving around the periphery of the windshield, which has a complicated curved surface rather than a planar surface, thus assuring smooth movement of the annular belt and hence the wiper blade. Furthermore, the annular belt is revolved by meshing with gear wheels, so that it can be smoothly driven at a place on the periphery of the windshield without slip. Further, since the annular belt and the wiper blade are connected together by connectors having rollers supported thereon for running in the roller runway groove in the guide rail, the wiper blade whose angle with the annular belt changes momentarily can be positively connected to the annular belt, so that the revolving motion of the annular belt can be smoothly transmitted to the wiping motion of the wiper blade. Further, since the guide rail is uniform in section throughout its periphery, by removing the packing from the periphery of the windshield of an existing automobile it is possible to install the guide rail with ease by utilizing the packing receiving groove. In addition, in the embodiments described above, the wiping device of the invention has been shown applied to the windshield of an automobile, the invention is not necessarily limited thereto and it may be applied to many other windowpanes which must be wiped, including the lateral and rear "windowpanes" of an automobile. As for the annular belt 2, besides the one described in the above embodiments, it is also possible to use an annular belt 2 shown in FIG. 8 (c) which comprises a spirally wound bendable core material 6a, such as piano wire, and a wire material 6 of substantially triangular section having wear resistance, such as polyamide resin, spirally wound on said core material to form tooth surfaces 7 on the convolutions of the wire material 6. Alternatively, as shown in FIG. 8 (d), a long sleeve 6d of synthetic resin, such as polyamide resin, preformed with tooth surfaces 7 may be used. In making the endless annular belt 2, besides the above embodiments, the two end halves of a round bar 50, as shown in FIG. 8 (d), may be inserted in the opposite end openings in the core material 6a, with rivets 51 driven thereinto at the ends of the core material 6a passing between convolutions of the continuous steel wire 6a, and the synthetic resin wire material 6 and sleeve 6d are then thermally bonded together. In the region where the annular belt 2 and the gear wheels 8 mesh with each other, the gear wheels 8 and annular belt 2 are housed in a case 53 which is filled with a lubricant to assure smooth transmission of power.

As has been described so far, according to the present invention, since the opposite ends of the bendable wire blade extending across the windshield are joined to the annular belt which revolves along the entire periphery of the windshield, with the revolving motion of the annular belt the wiper blade rotates sliding on the windshield to thoroughly wipe the latter. Moreover, since the wiper blade is capable of expansion and contraction, the wiper blade is movable while deforming to follow the configuration of the windshield, providing an advantage that the entire front surface of the windshield can be wiped irrespective of the configuration thereof.

What is claimed is:

1. A wiping device comprising: an annular belt adapted to revolve along the entire periphery of a windowpane, said periphery of said windowpane being non-circular; and a wiper blade joined at its opposite ends to said annular belt and extending across the windowpane said wiper blade having a variable length, capable of varying in response to positioning of said opposite ends on said annular belt.

2. A wiping device as set forth in claim 1, characterized in that said wiper blade is in the form of a pantograph having opposite serrated surfaces and a flat surface which is in contact with the windowpane.

3. A wiping device as set forth in claim 1, characterized in that said wiper blade is comprised of a series of elongated hollow blade bodies, wherein the internal peripheral surface of each of said elongated hollow blade bodies in said series is substantially similar in shape and slightly larger in size than the external peripheral surface of the next elongated hollow blade body in said series, such that each of said elongated hollow blade bodies in said series is slidably insertable within the next elongated hollow blade body in said series.

4. A wiping device comprising an annular belt adapted to revolve along the entire periphery of a windowpane, and a wiper blade joined at its opposite ends to said annular belt and extending across the windowpane, said wiper blade comprising a blade body of polygonal section made of elastic material capable of expansion and contraction, and a lengthwise expansible core material inserted in said blade body and joined thereto at the respective opposite ends.

5. A wiping device as set forth in claim 4, characterized in that said blade body is a long body of substantially triangular section, with each surface being concaved so that its opposite lateral edges alone are contacted with the windowpane.

6. A wiping device comprising a guide rail disposed over the entire periphery of a windowpane and having a runway groove extending throughout the length thereof, a bendable annular belt in the form of a wire material of substantially triangular section spirally wound to form tooth surfaces having a constant pitch on the outer surface thereof, a lengthwise expansible wiper blade connected at its opposite ends to said annular belt and mounted along the front surface of the windshield of an automobile, and gear wheels driven by a motor and meshing with the tooth surfaces of the annular belt.

* * * * *